United States Patent
Lin et al.

(10) Patent No.: US 8,079,864 B2
(45) Date of Patent: Dec. 20, 2011

(54) ELECTRONIC APPARATUS HAVING A COVER WHICH SYNCHRONOUSLY DEFINED AS A WALL OF A MODULAR JACK DISPOSED THEREOF

(75) Inventors: Kuo-Lung Lin, Tu-Cheng (TW); Wei-Chung Lin, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/784,499

(22) Filed: May 21, 2010

(65) Prior Publication Data

US 2010/0297869 A1   Nov. 25, 2010

(30) Foreign Application Priority Data

May 21, 2009   (TW) .................................. 98116822

(51) Int. Cl.
*H01R 4/50*   (2006.01)
(52) U.S. Cl. .................. 439/344; 439/354; 439/676
(58) Field of Classification Search .................. 439/344, 439/354, 357, 676
See application file for complete search history.

(56) References Cited

U.S. PATENT DOCUMENTS

| 5,385,479 | A | 1/1995 | Okada | |
|---|---|---|---|---|
| 5,773,332 | A * | 6/1998 | Glad | 439/344 |
| 6,464,533 | B1 | 10/2002 | Ma et al. | |
| 7,168,972 | B1 * | 1/2007 | Autry et al. | 439/344 |
| 2006/0014441 | A1 * | 1/2006 | Sato et al. | 439/676 |
| 2007/0111608 | A1 * | 5/2007 | Huang | 439/676 |
| 2010/0248554 | A1 * | 9/2010 | Hung et al. | 439/676 |

FOREIGN PATENT DOCUMENTS

| CN | 2684404 Y | 3/2005 |
|---|---|---|
| TW | 490102 | 6/2002 |

* cited by examiner

*Primary Examiner* — Hien Vu
(74) *Attorney, Agent, or Firm* — Andrew C. Cheng; Wei Te Chung; Ming Chieh Chang

(57) ABSTRACT

An electronic apparatus includes a base portion including a first cover, a second cover perpendicular to the first cover and a receiving cavity running through the first and second covers to respectively provide a locking slot in the first cover and an opening in the second cover. The first cover defines locking portions oppositely extending from opposite faces of the locking slot.

17 Claims, 6 Drawing Sheets

ELECTRONIC APPARATUS HAVING A COVER WHICH SYNCHRONOUSLY DEFINED AS A WALL OF A MODULAR JACK DISPOSED THEREOF

BACKGROUND OF THE INVENTION

1. Field of the Invention

The present invention relates to an electronic apparatus, and more particular to an electronic apparatus having a cover which is synchronously defined as a wall of a modular jack assembled thereof for miniaturization.

2. Description of the Related Art

U.S. Pat. No. 6,464,533 issued to Ma et al. on Oct. 15, 2002 discloses a modular jack including an insulative housing, a plurality of contacts retained in the housing and a shell enclosing the housing. The housing defines a top wall, a bottom wall opposite to the top wall, two sidewalls connecting with the top and bottom walls, and a mating cavity defined by the four walls commonly. The plurality of contacts is retained in the top wall and each defines an elastic contacting arm projecting into the receiving cavity. The bottom wall provides locking portions thereof for latching with a mating connector. The modular jack is disposed at a side edge of an electronic apparatus such as a personal computer with the receiving cavity opened outwards for receiving the mating connector therein.

However, the four walls may increase the dimension of the modular jack and the electronic apparatus having the modular jack. Obviously, an electronic apparatus suitable for miniaturization and having an electrical connector featured in low-profile configuration thereof is highly desired.

SUMMARY OF THE INVENTION

Accordingly, an object of the present invention is to provide an electronic apparatus having a cover which is synchronously defined as a wall of a modular jack featured in low-profile configuration.

In order to achieve the object set forth, an electronic apparatus includes a base portion including a first cover, a second cover perpendicular to the first cover and a receiving cavity running through the first and second covers to respectively provide a locking slot in the first cover and an opening in the second cover. The first cover defines locking portions oppositely extending from opposite faces of the locking slot.

Other objects, advantages and novel features of the invention will become more apparent from the following detailed description of the present embodiment when taken in conjunction with the accompanying drawings.

DETAILED DESCRIPTION OF THE INVENTION

Figure 1:
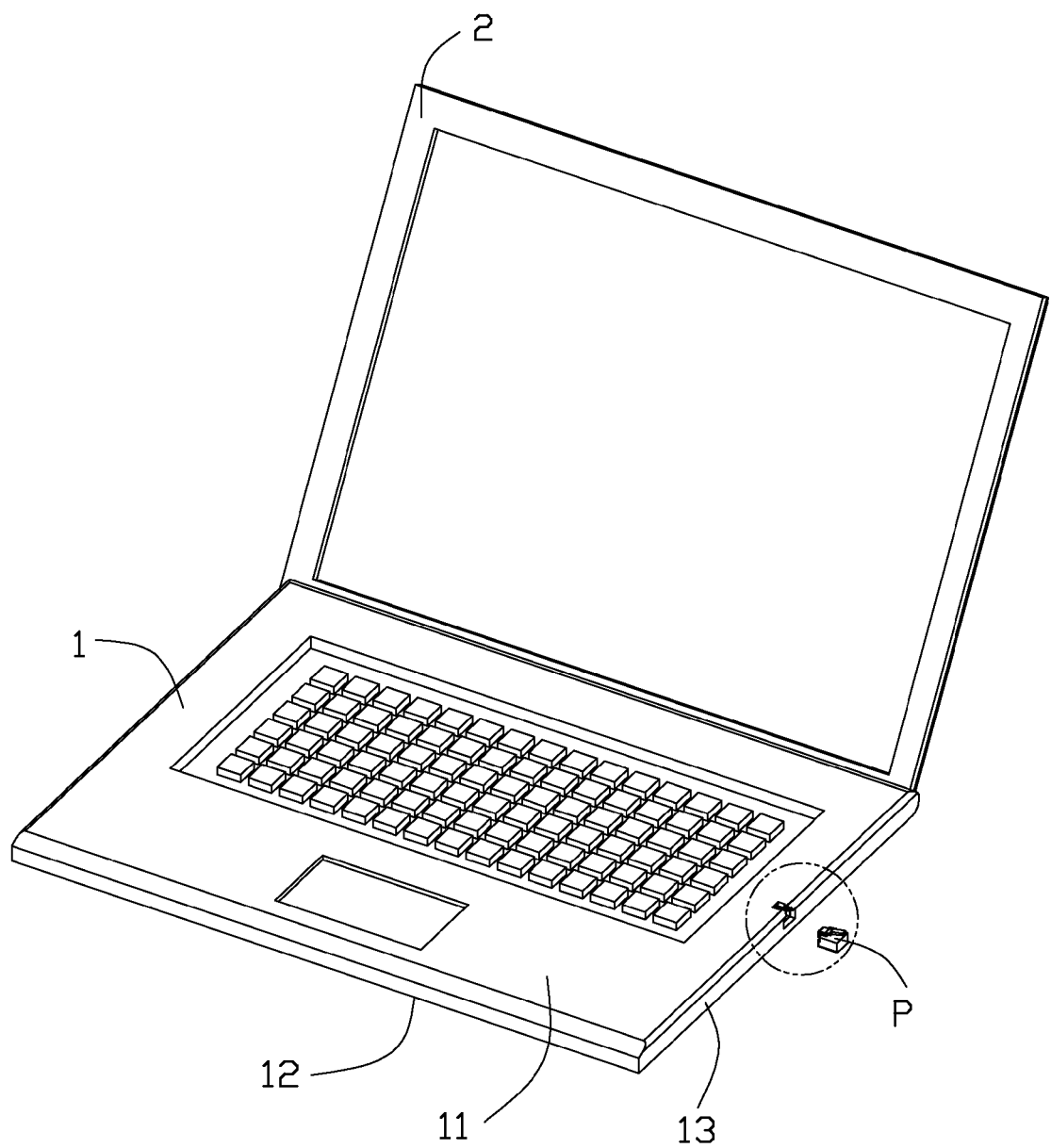
FIG. 1 is a perspective view of an electronic apparatus having an electrical connector disposed therein and a mating connector mating with the electrical connector.

Reference will now be made to the drawing figures to describe preferred embodiments of the present invention in detail.

Figure 2:
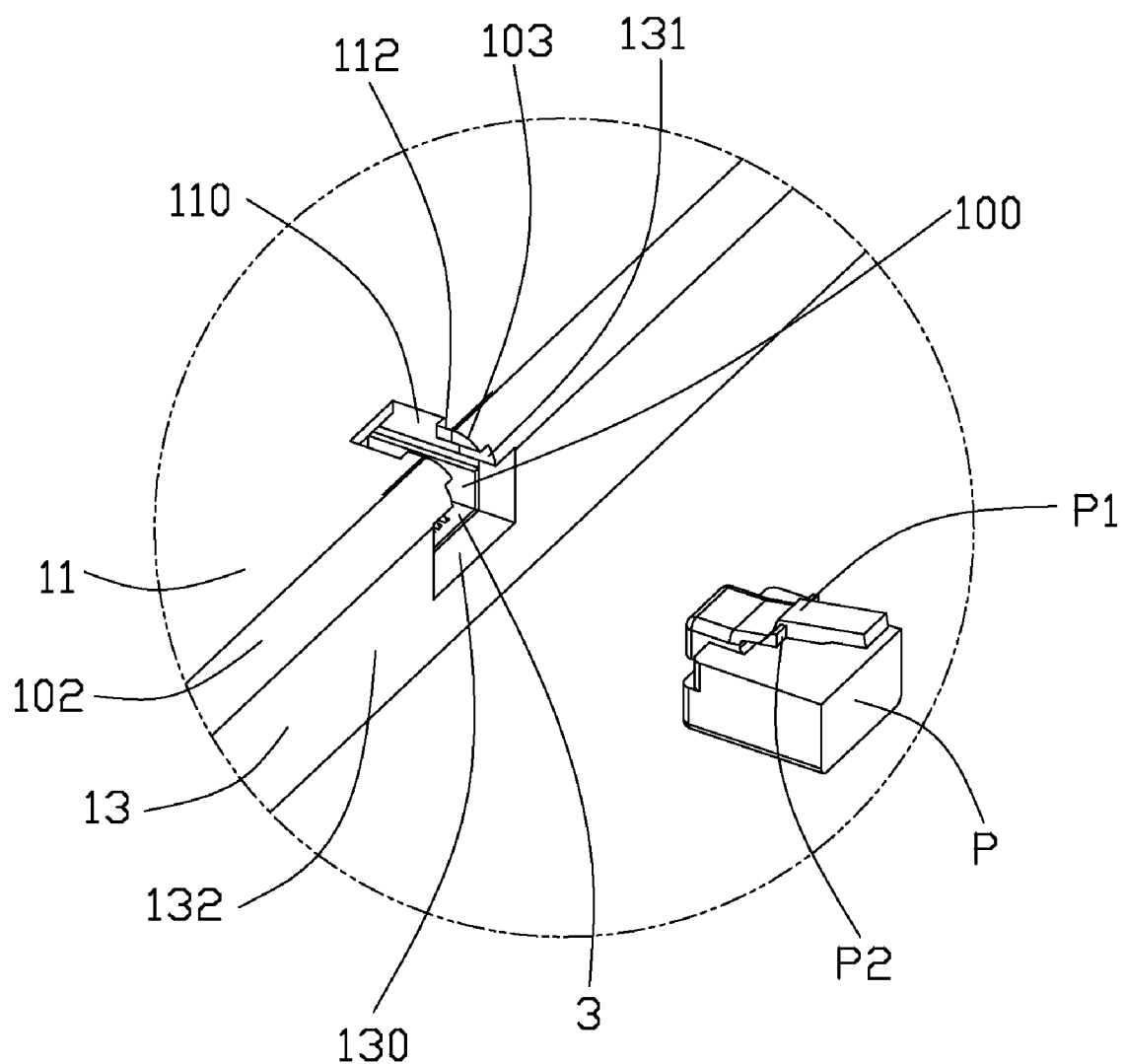
FIG. 2 is an amplificatory portion in the circle shown in FIG. 1.

FIG. 1 to FIG. 4 discloses a first embodiment of the present invention. Referring to FIGS. 1 and 2, an electronic apparatus such as a personal computer in the first embodiment includes a base portion 1 and a display 2 rotatably retained to the base portion 1. The base portion 1 includes a first cover 11, a bottom cover 12 opposite to the first cover 11, two second covers 13 connecting with the first and bottom covers 11, 12, a printed circuit board (PCB) which retains electronic components thereon and is disposed in a receiving space provided by the covers 11, 12, 13, and an electrical connector 3 disposed at a side edge of the base portion 1. The second cover 13 defines a sidewall 132 perpendicular to the first cover 11 and an arc-shaped connecting wall 102 connecting with the first cover 11 and the sidewall 132.

Figure 3:
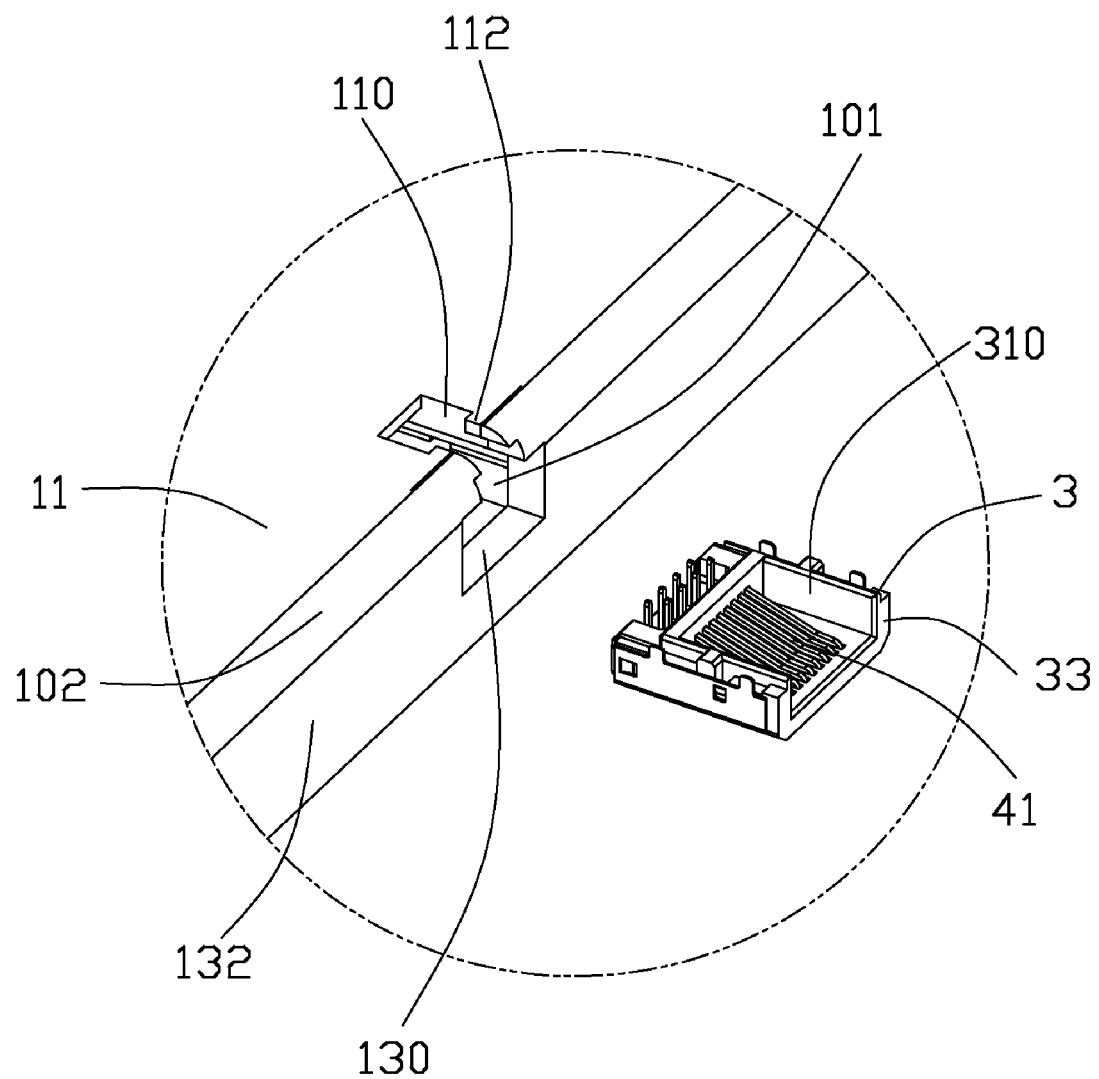
FIG. 3 is a perspective view of the electrical connector separated from the electronic apparatus shown in FIG. 2.

Referring to FIGS. 2 and 3, the base portion 1 defines a receiving cavity 101 disposed at a side edge thereof and opened sideward to run through the sidewall 132 and upwards to run through the first cover 11. A side opening 130 is provided in the sidewall 132 and a locking slot 110 is provided in the first cover 11. The opening 130 further extends upwards to run through the connecting wall 102 and provide a passageway 131 at the connecting wall 102. The passageway 131 has a smaller width as compared to that of the opening 130, and the connecting wall 102 defines a pair of protrusions 103 oppositely projecting into the passageway 131 at a top portion thereof. The first cover 11 defines a pair of locking portions 112 extending oppositely from two opposite face disposed in the locking slot 110 and each abutting against a corresponding protrusion 103 of the connecting wall 102.

Figure 4:
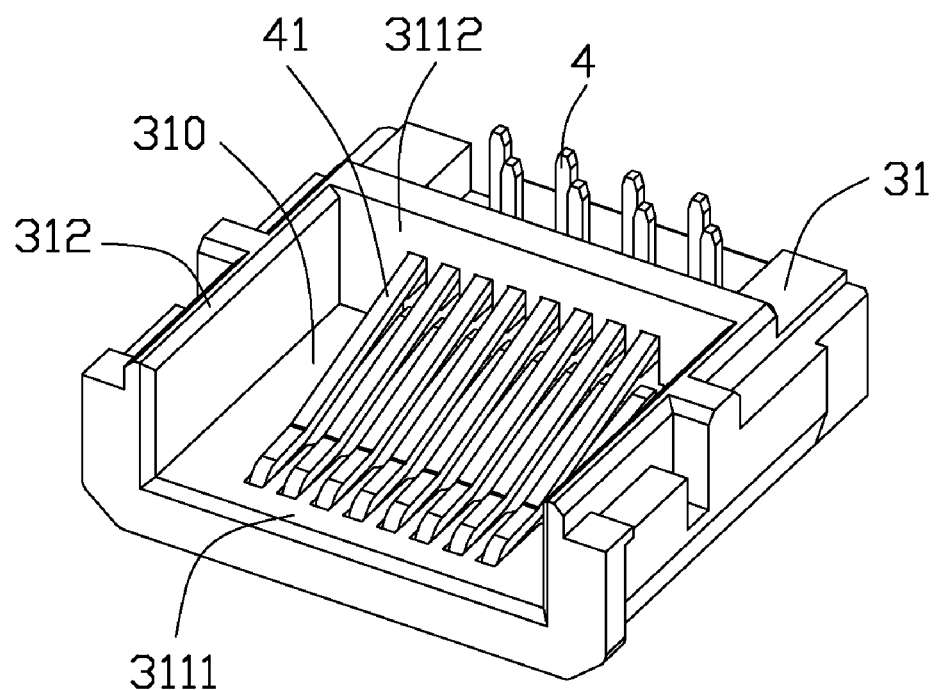
FIG. 4 is a partly explode view of the electrical connector shown in FIG. 3.
Figure 4:
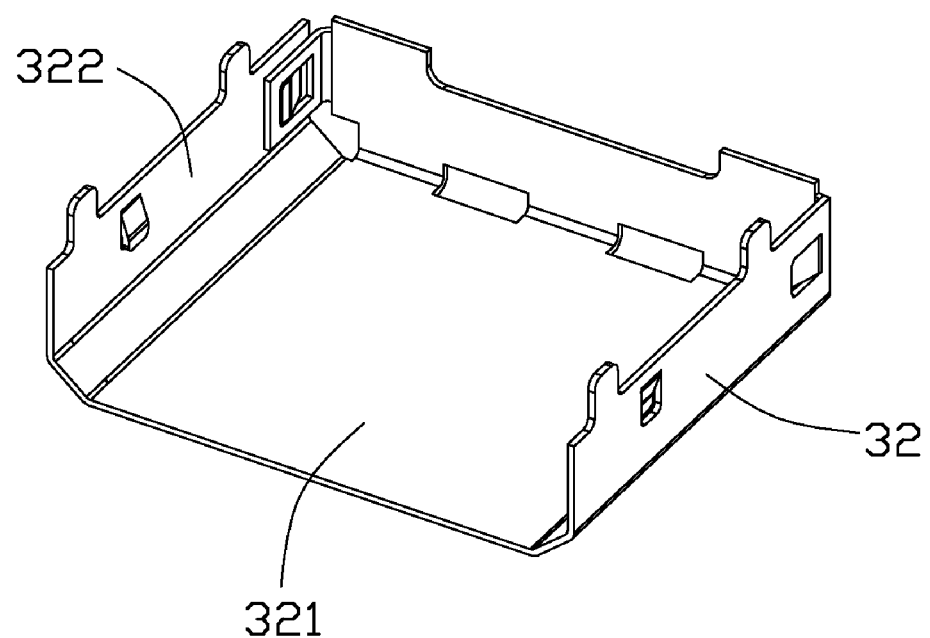

Referring to FIGS. 3 and 4, the electrical connector 3 is mounted onto the PCB and includes an insulative housing 31, a plurality of contacts 4 retained in the housing and a shell 32 enclosing the housing. The housing 31 defines a first wall 3111, a second wall 3112 perpendicular to the first wall 3111, two sidewalls 312 connecting with the first and second sidewalls 3111, 3112. A receiving room 310 opened upwards and sideward is provided by the first wall 3111, the second wall 3112 and the sidewalls 312 commonly. The plurality of contacts 4 is retained in the first wall 3111 and each defines an elastic contacting portion 41 projecting into the receiving room 310, the contacting portions 41 extend to the locking slot 110 and are angled with the first wall 3111. The shell 32 defines a bottom piece 321 and a pair of side pieces 322 bending upwards from two edge of the bottom piece 321, the shell 32 encloses the housing 31 with the bottom piece enclosing the first wall 3111 and the side pieces 322 enclosing the sidewalls 3112.

Referring to FIGS. 2 and 3, the electrical connector 3 is mounted onto the PCB disposed in the base portion 1 and received in the receiving cavity 101 with the mating face 33 facing to the opening 130. The locking slot 110 and the locking portions 112 of the first cover 11 are disposed over the receiving room 310, and the locking slot 110 communicates with the receiving room 310 and the opening 130. A mating cavity 100 is provided by the first and second covers 11, 13 of the electronic apparatus and the first wall 3111 and the sidewalls 3112 of the electrical connector 3 commonly, the opening 130 is provided as a mating opening of the mating cavity 100. When a mating connector P is inserted into the mating cavity 100 from the opening 130 to mate with the electrical connector 3, the latching arm P1 runs through the passageway 131 and into the latching slot 110, and the latching portions 112 may interconnect to the latching faces P2 of the latching arms P1 to retain the mating connector P in the mating cavity 100 securely. The protrusions 103 can block the locking portions 112 to reinforce the rigidity of the locking portions 112. The first cover 11 of the electronic apparatus having latching slot 110 and the latching portions 112 are jointly defined as a wall of the electrical connector 3, so that a wall opposite to the first wall 3111 of the electrical connector 3 for latching with a mating connector as disclosed in a conventional modular jack is omitted, which can reduce the height and cost of the electrical connector 3. The first cover 11 of the electronic apparatus is synchronously defined as a wall of the electrical connector 3, which benefits the miniaturization of the electronic apparatus.

Figure 5:
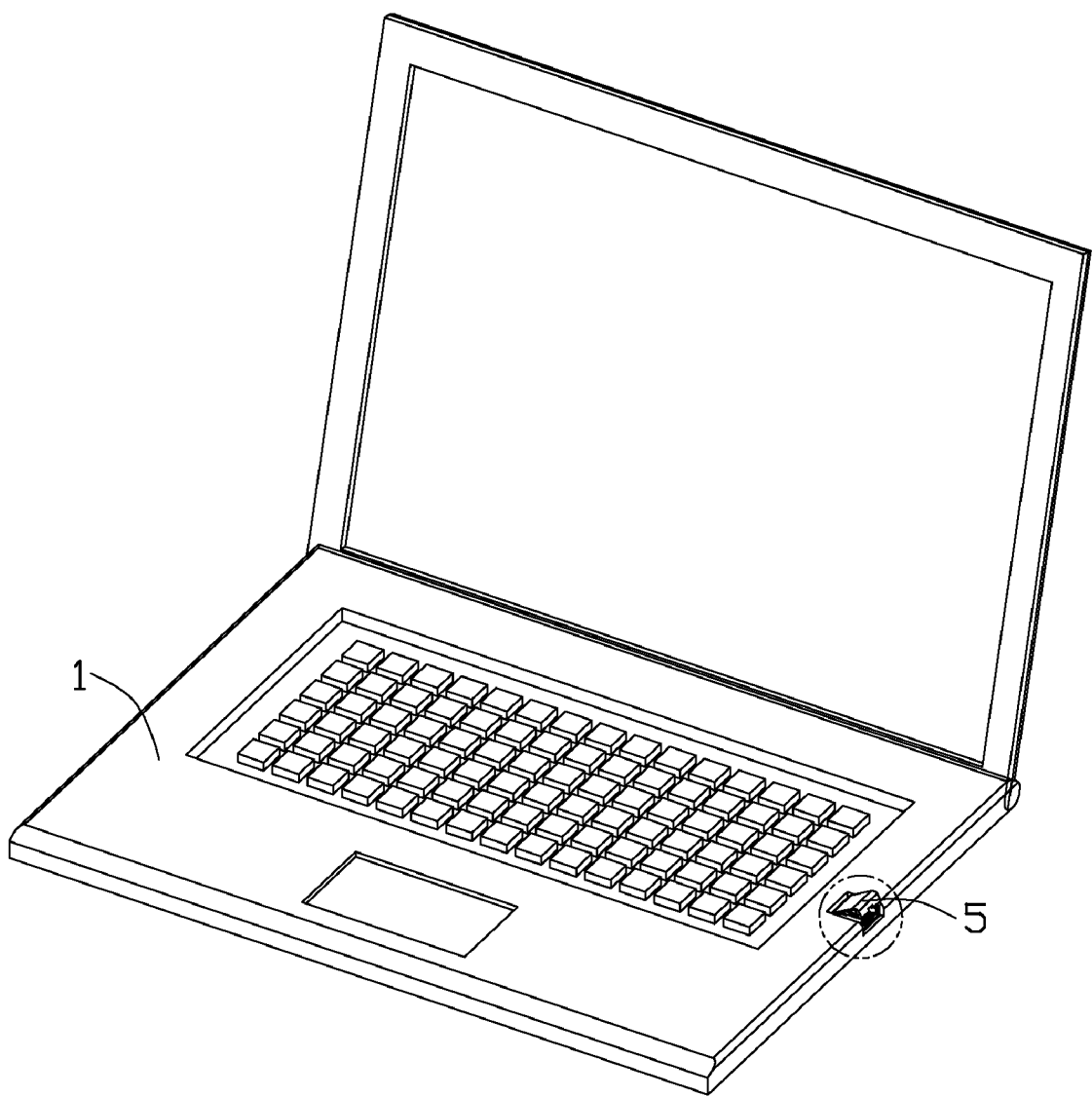
FIG. 5 is a perspective view of the electronic apparatus in accordance with a second embodiment of the present invention.
Figure 6:
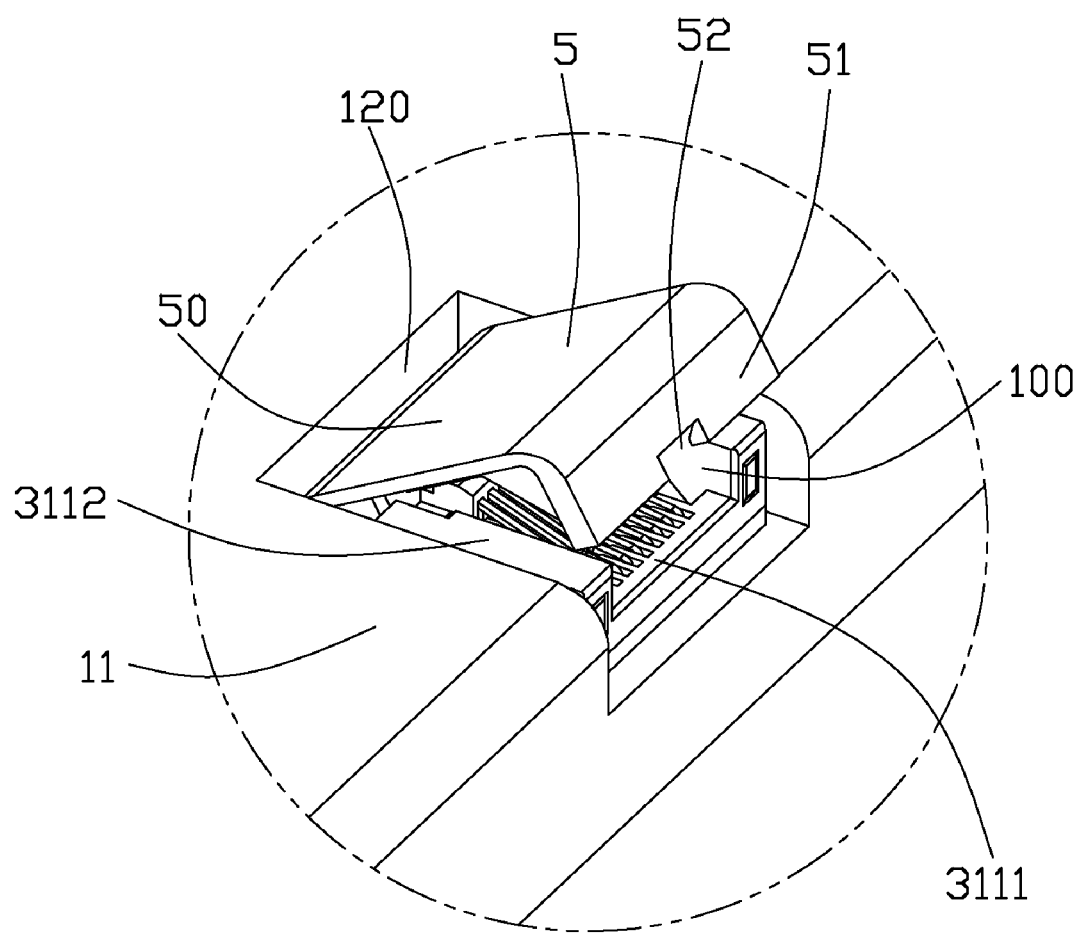
FIG. 6 is an amplificatory portion in the circle shown in FIG. 5, showing a cover board remained at an opened position.

FIG. 5 and FIG. 6 disclose a second embodiment of the present invention. The electrical connector in this embodiment has similar configuration as that in the first embodiment and is received in a receiving cavity 120 disposed at a side edge of the base portion 1. The first cover 11 defines an L-shaped cover board 5 rotatablely retained in the receiving cavity 120. The cover board 5 defines a flat body portion 50, a pair of blocking portions 51 extending perpendicularly to the body portion 50 from two sides of the body portion 50 and a passageway 52 disposed between the two blocking portions 51. A mating cavity 100 is provided by the cover board 5, the first wall 3111 and the sidewalls 3112 commonly when the cover board 5 rotated to remain at an opened position, and the opening 130 is defined as a mating opening of the mating cavity 100. The blocking portions 51 can lock with a mating connector to retain the mating connector in the mating cavity 100 steadily. The cover board 5 of the first cover 11 is also provided as a wall of the electrical connector 3 for latching with a mating connector, which can reduce the height of the electrical connector 3. The first cover 11 of the electronic apparatus is synchronously defined as a wall of the electrical connector 3, which also benefits the miniaturization of the electronic apparatus.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic apparatus comprising:
a base portion including a first cover, a second cover perpendicular to the first cover and a receiving cavity running through the first and second covers to respectively provide a locking slot in the first cover and an opening in the second cover;
wherein the first cover defines locking portions oppositely extending from opposite faces of the locking slot;
wherein the second cover defines a sidewall perpendicular to the first cover and a connecting wall connecting with the first cover and the sidewall, and the opening is defined in the sidewall;
wherein the opening extends upwards to run through the connecting wall and provide a passageway therein;
wherein an electrical connector to be assembled to the electronic apparatus comprising an insulative housing to be retained in the receiving cavity, defining a first wall opposite to the locking slot; and a plurality of contacts retained in the first wall;
wherein a mating cavity for receiving therein a mating connector which defines a latching arm for latching with the locking portions is defined between the first cover of the electronic apparatus and the first wall of the electrical connector, the opening communicates with the mating cavity and is defined as a mating opening of the mating cavity;
wherein the electrical connector does not have a wall opposite to the first wall.

2. The electronic apparatus as described in claim 1, wherein the connecting wall is arc-shaped, and the locking portions are adjacent to the connecting wall.

3. The electronic apparatus as described in claim 2, wherein the connecting wall defines protrusions oppositely projecting into the passageway and abutting against the corresponding locking portions.

4. The electronic apparatus as described in claim 1, wherein the first cover defines a cover board rotatablely retained in the receiving cavity.

5. The electronic apparatus as described in claim 1, wherein said electronic apparatus is a notebook computer including a keyboard portion and a display portion, and said base portion is said keyboard portion under condition that the first cover defines a primary face on which a keyboard is located, and the second cover defines a side face where a plurality of openings are formed for an input/output arrangement with corresponding plugs.

6. The electrical connector as described in claim 1, wherein the electrical connector does not have any portion for latching with the latching arm.

7. The electrical connector as described in claim 1, wherein the housing defines two opposite sidewalls connecting with the first wall, and the mating cavity is provided by the first cover, the first wall and the sidewalls commonly.

8. The electrical connector as described in claim 1, wherein the electrical connector defines a shell enclosing the housing.

9. A bare type modular jack for use with a corresponding plug equipped with a deflectable latch thereof, comprising:
an insulative housing defining a mating face;
a plurality of contacts disposed in the housing, each of said contacts including a contacting section obliquely and backwardly extending from a position adjacent to a front edge of said mating face; and
a mating space defined neighboring the mating face for receiving said plug, in which said contacting sections extend for coupling to terminals of said plug; wherein said modular jack is not independently equipped with any locking portions for latchable engagement with the plug but adapted for cooperating with a cover of a notebook computer having a locking slot therein for commonly retaining the plug in said mating space during mating with the plug;
wherein a metallic shell encloses the housing opposite to said mating space;
wherein both a height of said housing and that of said shell is less that that of the mating space;
wherein said housing independently forms only a portion of an insertion opening in front of said mating space for the plug.

10. The bare type modular jack as claimed in claim 9, wherein said modular jack independently forms only a portion of said mating space in a height direction perpendicular to a plug insertion direction.

11. The bare type modular jack as claimed in claim 10, wherein a complete dimension of said mating space is formed via cooperation of said modular jack and said cover.

12. The bare type modular jack as claimed in claim 10, wherein a height of said housing is less than that of the mating space.

13. The bare type modular jack as claimed in claim 9, wherein a complete dimension of said insertion opening is formed via cooperation of said modular jack and said cover.

14. The bare type modular jack as claimed in claim 9, wherein each of said contact includes a soldering leg extending upwardly from a rear position of the insulative housing and the contacting sections of said contacts extend toward said soldering legs obliquely and upwardly.

15. The bare type modular jack as claimed in claim 14, wherein said soldering legs define a mounting surface under distal ends of the contacting sections.

16. The bare type modular jack as claimed in claim 9, wherein each of said contact includes a soldering leg extending from a position adjacent to the metallic shell toward said cover.

17. The bare type modular jack as claimed in claim 16, wherein said soldering legs define a mounting surface within the height scope of the said insulative housing.

* * * * *